United States Patent [19]

Gratzer

[11] Patent Number: 5,127,503
[45] Date of Patent: Jul. 7, 1992

[54] LIQUID FRICTION COUPLING

[75] Inventor: Franz Gratzer, St. Johann, Austria

[73] Assignee: Steyr-Daimler-Puch AG, Vienna, Austria

[21] Appl. No.: 722,591

[22] Filed: Jun. 27, 1991

[30] Foreign Application Priority Data

Jul. 5, 1990 [AT] Austria .................. 1436/90

[51] Int. Cl.$^5$ ............................................. F16D 31/00
[52] U.S. Cl. .................. 192/58 B; 192/70.11
[58] Field of Search .............. 192/58 B:58 C, 82 T, 192/70.11

[56] References Cited

U.S. PATENT DOCUMENTS

| | | | |
|---|---|---|---|
| 3,261,230 | 7/1966 | Rudnicki | 74/710.5 |
| 4,058,027 | 11/1977 | Webb | 192/58 B X |
| 4,683,997 | 8/1987 | Stockmar et al. | 192/58 C |
| 4,683,998 | 8/1987 | Cigdem et al. | 192/58 C |
| 4,703,842 | 11/1987 | Leinfellner et al. | 192/58 B |
| 4,785,016 | 11/1988 | Masuda et al. | 74/650 |
| 4,889,206 | 12/1989 | Weise et al. | 192/58 C X |
| 4,942,951 | 7/1990 | Kriebernegg et al. | 192/58 B X |
| 4,982,808 | 1/1991 | Taureg et al. | 192/58 C X |

FOREIGN PATENT DOCUMENTS

| | | |
|---|---|---|
| 383195 | 5/1987 | Austria . |
| 157236 | 10/1985 | European Pat. Off. . |
| 3828421 | 3/1989 | Fed. Rep. of Germany . |
| 62-137429 | 6/1987 | Japan . |
| 1-35128 | 2/1989 | Japan .................. 192/58 B |
| 1-216127 | 8/1989 | Japan .................. 192/58 B |
| 1158689 | 7/1969 | United Kingdom . |
| 2222232 | 2/1990 | United Kingdom . |

Primary Examiner—Leslie A. Braun
Assistant Examiner—Andrea Pitts
Attorney, Agent, or Firm—Marmorek Guttman & Rubinstein

[57] ABSTRACT

A liquid friction coupling is disclosed, which comprises a housing, which constitutes one coupling part and is filled with a viscous liquid, a shaft, which protrudes into the housing and constitutes the other coupling part, interdigitating disks, which are nonrotatably connected in alternation to the housing and to the shaft, respectively, and spacers disposed between the disks. In order to improve the torque characteristic during an operation involving liquid friction and to achieve a steeper rise of the hump torque, each of the outer or inner disks entirely or in part tends to exhibit a thermal deformation in an axial direction and a spacer ring is provided between each inner disk and an outer disk of an adjacent pair of disks.

22 Claims, 4 Drawing Sheets

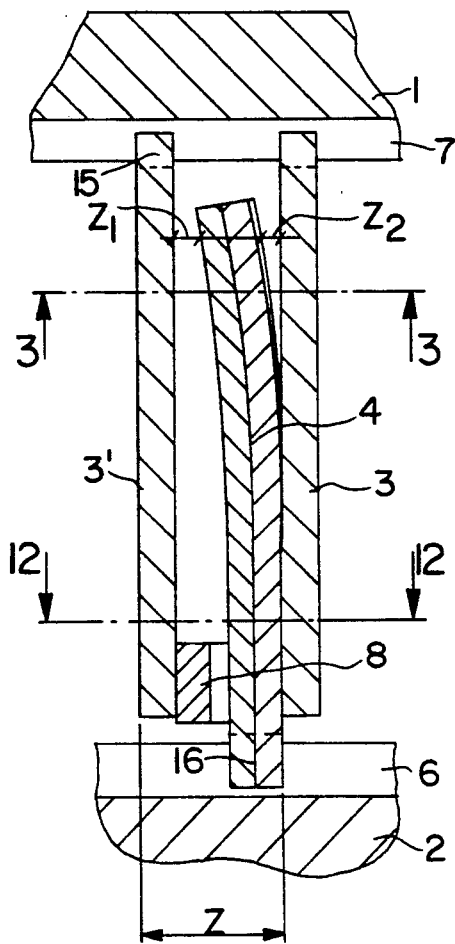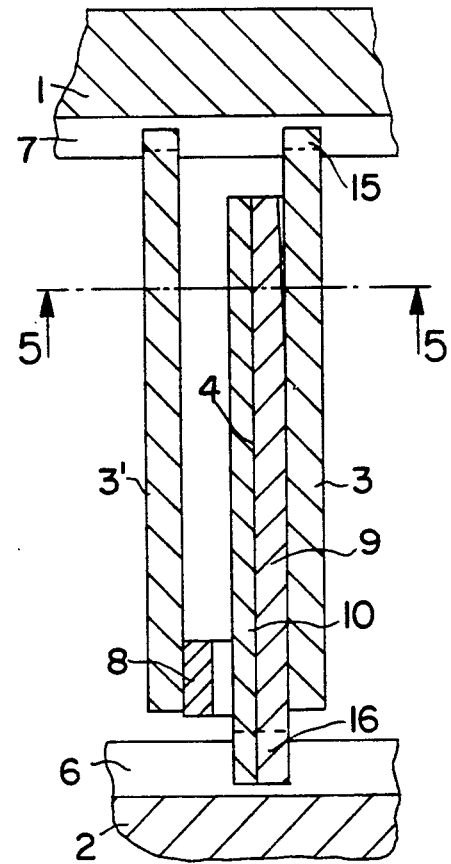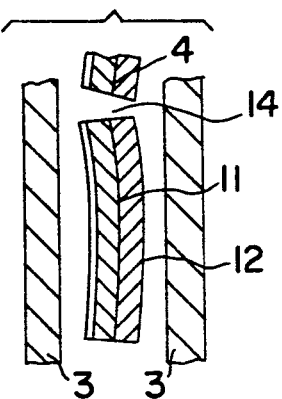
FIG.2
FIG.4
FIG.3
FIG.5

LIQUID FRICTION COUPLING

BACKGROUND OF THE INVENTION

1. Field of the Invention

This invention relates to a liquid friction coupling comprising a housing, which constitutes one coupling part and is filled with a viscous liquid, a shaft, which protrudes into said housing and constitutes the other coupling part, interdigitating disks, which are nonrotatably connected in alternation to the housing and to the shaft, respectively, and spacers disposed between said disks.

2. Description of the Prior Art

Liquid friction couplings of that kind are used, e.g., in vehicle drives. They have the advantage that the torque transmitted by the coupling will increase as the differential speed is increased.

Conventional liquid friction couplings have the disadvantage that at a given differential speed the torque being transmitted by the coupling will decrease in response to the temperature rise which is due to the heat generated by viscous friction. As a result, the torque will be too high at a low temperature, when the coupling begins to slip, and will be too low at a high temperature.

To oppose that undesirable torque change it is known, e.g., from Austrian Patent Specification 383,195, to reduce the width of the gaps between the disks by means of a pressure-applying member, which is disposed outside the disk-containing space and tends to exhibit a thermal deformation acting axially on the disks. The torque being transmitted by the coupling progressively increases as the width of the gaps decreases.

But the coupling described in that Austrian patent specification involves a high structural expenditure owing to the pressure-applying member, which is laterally disposed, and to the resilient spacers, which are required to equalize the disk spacing. Whereas such a coupling will have the desired torque characteristic during an operation involving liquid friction, this will not be the case during an operation involving metal-to-metal friction, which is desired to occur above a certain temperature and involves a very steep torque rise. That range, which owing to the strong torque rise is called hump range, is important for the protection of the coupling from thermal overloading. But that protection will not be afforded unless the hump torque is sufficiently high. When a vehicle is about to overcome an obstacle off the road and one of the driven wheels is slipping, the hump torque transmitted by a liquid friction coupling connected between the slipping wheel and a non-slipping wheel shall be so high that either the obstacle is overcome or the motor is stalled.

The steep torque rise during an operation involving metal-to-metal friction may be due to the fact, inter alia, that the viscous liquid between two disks is displaced and that the unilateral action of the internal pressure, which increases as a result of the temperature rise, causes the disks of each pair to contact each other. To ensure that state will be assumed, the viscous liquid between the disks must be displaced—for that purpose it is usual to provide the disks with scraping edges—and the unilateral pressure must be sufficient to force the disks of each pair against each other. To produce a hump torque which is as high as possible, the area in which the metallic surfaces actually contact each other must be as large as possible. This means that the disks of each pair must contact each other throughout their confronting surfaces to the largest extent possible.

This is not the case in the coupling disclosed in said Austrian patent specification in spite of the provision of resilient spacers. Whereas the latter equalize the spacing of the inner disks, the positions of the displaceable outer disks relative to the inner disks will remain indefinite and will be at random so that the metal-to-metal friction between the disks of each pair will not be initiated at the same time and will not occur between the disks of all pairs.

The indefinite position of the outer disks (or the indefinite position of displaceable inner disks) will give rise to a wear of the disks also during an operation involving liquid friction and that wear will change the torque characteristics of the coupling in the course of time.

It is known from German Patent Specification 38 28 421 that the scraping action for accelerating the displacement of the viscous liquid between two disks can be improved in that the conventional known scraping edges are omitted and sectors of the disks are bent about radial bend lines. Whereas this will increase the hump torque, the behaviour during an operation involving liquid friction will not be improved. Besides, a larger number of disks will be required and the wear of the disks will be increased.

SUMMARY OF THE INVENTION

For this reason it is an object to the invention to provide a liquid friction coupling which is of the kind described first hereinbefore and which involves a low structural expenditure and provides for an improved torque characteristic during an operation involving liquid friction and a high and steep torque rise during an operation involving solid-to-solid friction and will be subjected only to a small wear so that its torque characteristic will not change for a long operating life.

This is accomplished in accordance with the invention in that each of the outer or inner disks entirely or in part tends to exhibit a thermal deformation in an axial direction and a spacer ring is provided between each inner disk and an outer disk of an adjacent pair of disks.

Because the disks or disk parts tend to exhibit a thermal deformation in an axial direction, the torque rise resulting from a decrease of the gaps width will compensate the torque drop resulting from temperature rise. As a result, the torque will be constant or will slightly rise during an operation involving viscous friction. For this reason, the torque characteristic of the coupling can be selected to provide a very gentle initiation of the slippage, i.e., a low torque at a low temperature. Such a characteristic is highly desirable for a dynamic performance.

Because the disks have a variable curvature and the relative position of the disks cooperating with each other is defined by the spacer rings, a state involving metal-to-metal friction will be assumed by all pairs of disks completely and at the same time so that the hump torque will rise sharply.

Because the spacer rings define the relative position of all disks which cooperate with each other the wear occuring during an operation involving viscous friction will be reduced so that the torque characteristic of the coupling will not be changed during the life thereof.

From one aspect of the invention the disks or disk parts which tend to exhibit a thermal deformation may be made from an alloy having a shape memory or may be made entirely or in part of a bimetal. The rise of the torque characteristic may be due to a suitable predeformation in one case and in the other case may be due to the use of pairs of properly selected materials and selected thickness for the two metallic layers.

The outer disks or the inner disks may entirely consist of a material which tends to exhibit a thermal deformation and in a cold state may be curved in bowl shape from the adjacent surface of the cooperating disk. In response to a temperature rise said bowl-shaped disks will approach a planar shape, i.e., they approach the cooperating disk so that there will be a stronger rise of the torque even during operation involving viscous friction because gaps will decrease in a radially outward direction. This decrease progressing in outward direction will also lead to all pairs of disks reaching metal-to-metal friction simultaneously.

Within the scope of the invention a side face of each spacer ring is only in partial contact with at lease one of the two adjacent disks. The only partial contact will result in a hydrodynamic lubrication. A hydrodynamic lubrication, which is independent of the sense of rotation, can be achieved on both sides in a particularly simple manner by the provision of corrugated spacer rings.

It will be particularly desirable to provide the spacer rings at the inside periphery of the outer disks so that contact surface between the disks will be lost in the region where it would transmit the smallest torque and where the hydrodynamic lubrication will still be sufficient.

In a preferred embodiment it is the inner disks that tend to exhibit a thermal deformation so that no axial displacement of the outer disks in the region in which they are non-rotatably connected to the housing and in which they have the largest surface in contact with the housing will occur so that power losses and wear will be minimized.

In a preferred embodiment the inner disks are divided by radial slots into sectors and owing to their tendency to exhibit a thermal deformation are convexly curved in a peripheral direction toward the cooperating disk in a cold state whereas they are slightly concavely curved away from the cooperating disk at an elevated temperature. As a result, the disk will be forced by hydrodynamic forces away from the cooperating disk when the coupling is cold so that the gap will be widened and the torque being transmitted will decrease and scraping edges will be formed at the temperature at which metal-to-metal friction is desired.

In a modification of the first aspect, the spacer rings may be integral with the associated inner disks. This will simplify the manufacture and assembling and the contact surface between the spacer ring portion and the cooperating outer disk may be so designed that hydrodynamic lubrication will occur. The saving will be particularly high if the inner disks integrally formed with the spacer rings are made from flat starting material by embossing or stamping. If they are made of an alloy having a shape memory that shaping operation may also involve the desired preshaping.

From a second aspect of the invention the outer disks are provided at their inside periphery with annular portions, which tend to exhibit a thermal deformation in an axial direction and which also constitute spacer rings cooperating with the adjacent inner disk of the adjacent pair of disks. In that case the gaps on both sides of each outer disk will have a large, equal width so that the torque will be particularly low when slippage begins and an automatic control will be achieved in a very wide range until the action of the thermally responsive annular portion contacting also the cooperating disk will result in an operation involving metal-to-metal friction. Besides, in that case, in which the remainder of each outer disk consists of a material which does not tend to exhibit a thermal deformation, the outer disks will always remain parallel to the inner disks.

Within that second aspect the annular portions or the entire outer disks may be made of an alloy which has a shape memory. It will be particularly convenient to make the entire outer disk of such alloy and so to preshape the entire outer disk that the shape memory will be effective only in the inner portions of the outer disks.

Within that second aspect the annular portion preferably consists of a plastic, particularly of PTFE (polytetrafluoroethylene), and a preferably radially split ring of metal, preferably steel, is inserted in said plastic outside its radial and peripheral plane of symmetry. In that case the desired warping will result owing to the different coefficients of expansion of the two materials.

BRIEF DESCRIPTION OF THE DRAWING

FIG. 2 is an enlarged view showing the detail D in FIG. 1 of a first embodiment of the invention in a state involving liquid friction.

FIG. 3 is a peripheral sectional view taken on line 3—3 in FIG. 2.

FIG. 4 is a view which is similar to FIG. 2 but illustrates a state involving solid-to-solid friction (hump range).

FIG. 5 is a peripheral sectional view taken on line 5—5 in FIG. 4.

DETAILED DESCRIPTION OF THE PREFERRED EMBODIMENTS

Several illustrative embodiments of the invention will now be described more in detail with reference to FIGS. 1 to 12.

Figure 1:
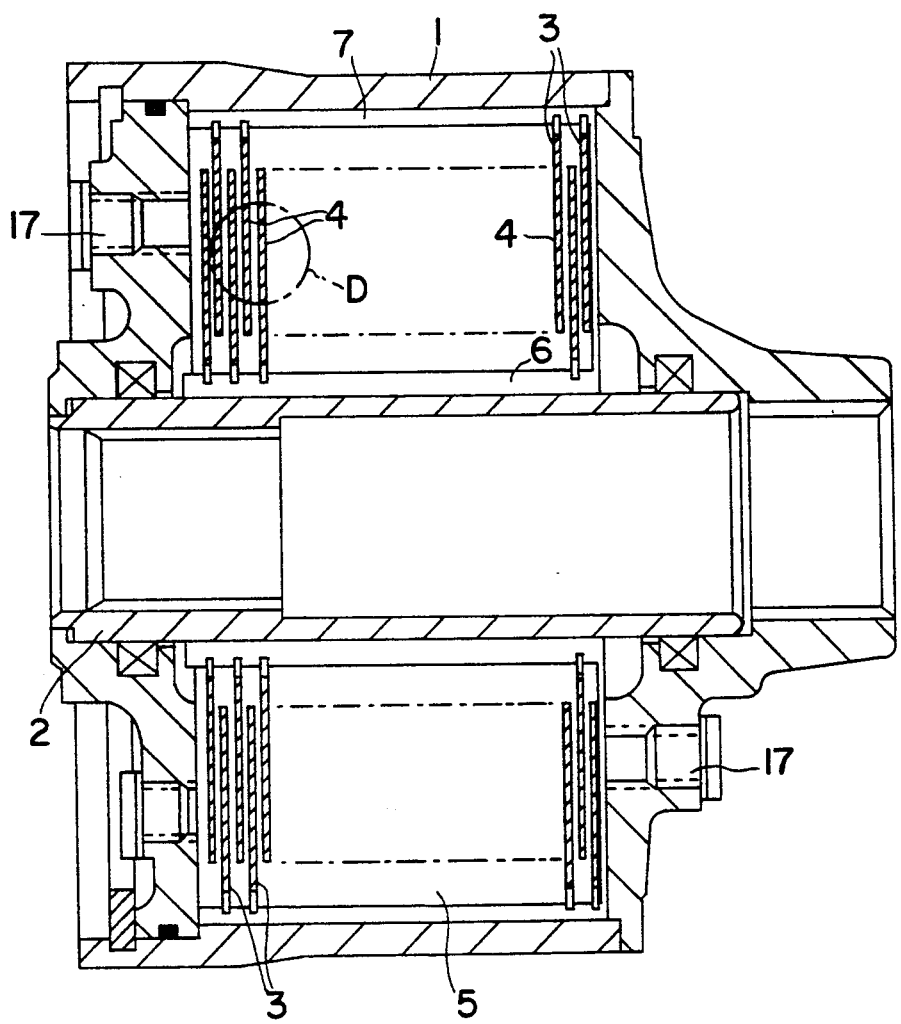
FIG. 1 is an axial sectional view showing a liquid friction coupling which is known in the art and can be modified to embody various features of the invention.
Figure 12:
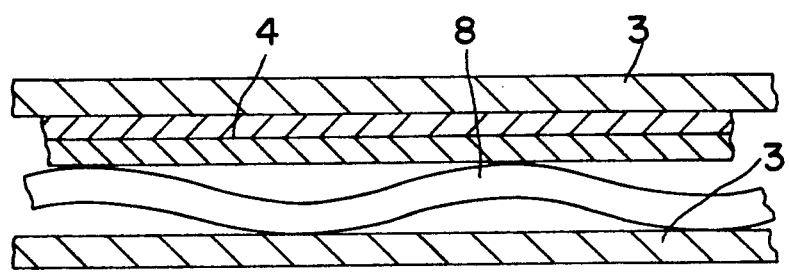
FIG. 12 is a developed sectional view taken on line 12—12 in FIG. 2.

The liquid friction coupling in accordance with the invention is incorporated, e.g., in a differential gear train provided between two driven axles of a vehicle. One part of the coupling comprises a housing 1, which is rotatably mounted on a tubular shaft 2, which is included in a second part of the coupling. A set of outer disks 3 extend in the housing 1 and are non-rotatably connected thereto and interdigitate with inner disks 4, which constitute a second set of disks and are non-rotatably connected to the tubular shaft 2. The disks 3 and 4 are only schematically shown in FIG. 1 and their design in accordance with the invention and parts associated with them will be described more in detail hereinafter. Four outer disks 3 and four inner disks 4 are shown in FIG. 1 but it will be understood that the coupling may comprise any desired number of pairs of disks, which have the same design and consist each of an outer disk and an inner disk. The housing 1 defines an interior space 5, in which the disks 3 and 4 extend and which is filled with a viscous liquid, which has been introduced through ports, which are sealed by removable plugs 17.

FIG. 2 and all analogous radial sectional views show the housing 1 to be provided with suitable internal splines 7, which cooperate with mating external splines 15 of the outer disks 3 so that the latter are non-rotatably connected to the housing 1. Similarly, the tubular shaft 2 is provided with external splines 6 in mesh with mating internal splines 16 of each inner disk 4 so that the latter is non-rotatably connected to the shaft 2. The design of the internal splines 6 may freely be selected, provided that they permit a transmission of torque by and slight axial displacements of the disks.

The disks 3 and 4 constitute a pair of disks. The number of such identical pairs of disks in the coupling will be determined by the designer of the coupling. The inner disk of a pair of disks which are adjacent to the disk 4 is designated 3'.

In a preferred embodiment shown in FIGS. 2 to 5 the inner disk 4 tends to exhibit a thermal deformation in an axial direction. To that end, it may consist of an alloy which has a shape memory (such an inner disk is not shown) or may consist of firmly joined bimetal plates 9, 10. For instance, the plate 9 may consist of iron and the plate 10 may consist of aluminum. The two outer disks 3, 3' consist of conventional material. FIGS. 2 and 3 show that embodiment in a state assumed at ambient temperature so that the inner disk 4 is curved in an axial direction, as shown. If the inner disks consist of bimetal, that shape will be assumed by the disk if the materials and thicknesses of the plates 9 and 10 of the bimetal disk are properly selected and the plates 9 and 10 have been joined when they are at a suitable temperature. A disk made of an alloy having a shape memory will assume that shape if the disk has suitably been shaped at a suitable temperature.

As is shown in FIG. 3, each inner disk 4 may be divided into sectors by radial slots 14 having open outer ends so that an axial deformation will not be restricted by peripheral stresses. FIGS. 2 and 3 illustrate the state which is assumed at a low temperature and involves liquid friction and the gap widths z1 and z2 are apparent on the left and right of the inner disk. Said gap widths change along the radius. Owing to the approximately hyperbolic relation which is known to exist between the torque being transmitted and the ratio of the gap widths z1 to z2 when a constant spacing z is maintained between two adjacent outer disks 3 and 3', only a small low torque will be transmitted in that state. It must be borne in mind that the outer zone in which the gap z2 has the largest width makes a larger contribution to the torque being transmitted than the inner zone.

It is also apparent from FIG. 3 that in an inner disk 4 in which each sector is curved also in a peripheral sectional view the disk 4 will have a concavely curved surface 12 facing the outer disk 3 of the same pair of disks. The presence of that concave curvature will result in a hydrodynamic action, which tends to increase the width of the gap z2. It will be understood that concavely curved surface will not be provided unless the inner disk 4 is divided into sectors by radial slots 14.

If the temperature rises due to slippage losses, the inner disk will flatten so that the gap width z2 will slowly decrease to an extent which increases in an outward direction and the average gap width and the torque being transmitted will thus gradually be increased. By that action the fact that the torque being transmitted decreases owing to the decrease of viscosity during a temperature rise will be offset. In dependence of the design of the thermally responsive inner disk 4 it is thus possible to achieve a torque characteristic which is entirely independent of temperature or to achieve even a slight torque rise in response to a temperature rise.

As soon as the temperature at which solid-to-solid friction is to be initiated has been reached, the inner disk will be almost straight in the radial sectional view shown in FIG. 4 and will move into contact with the outer disk of the same pair of disks easily and without a delay. That fast movement into contact with the outer disk of the same pair of disks will be promoted by the distribution of pressure adjacent to the inner disk. That distribution of pressure is due to the fact that the higher internal pressure is applied only to the outer portion of that surface with which the inner disk faces the other disk of the same pair of disks but will be applied to the entire surface with which the inner disk faces away from the outer disk of the same pair of disks. Owing to the thermal deformation the curvature of each sector of the inner disk in a peripheral sectional view will be changed from a convex curvature to a concave one in response to the temperature rise so that scraping edges 13 will be formed, which will effect a sudden and complete change to a state which involves solid-to-solid friction.

FIGS. 2 and 4 show also that a spacer ring 8, which is provided between the inner disk and the outer disk 3', which does not cooperate with the inner disk 4 but belongs to an adjacent pair of disks, defines the distance between the inner disk 4 and the outer disk 3'. In the prior art, spacers are used to define the distance between similar disks of adjacent pairs of disks. Because the spacer rings 8 tend to maintain uniform distances between each inner disk 4 and the outer disk 3' of the next adjacent pair of disks, the wear of the disks during an operation involving liquid friction will be reduced and the simultaneous initiation of a state involving solid-to-solid friction in all pairs of disks will be promoted. The hydrodynamic action of the spacer ring is due to a hydrodynamic lubrication and to the fact that the spacer ring is provided at the inner periphery of the outer disk 3'.

That lubrication is desirably achieved even when the slip is still very small, i.e., when there is only a small difference between the velocities of the contacting surfaces of the spacer ring 8 and the outer disk 3'. To that end the spacer ring may be formed with lubricating pockets (such as are indicated at 33 in FIG. 9) or may consist of a corrugated ring (see FIG. 12).

Figure 6:
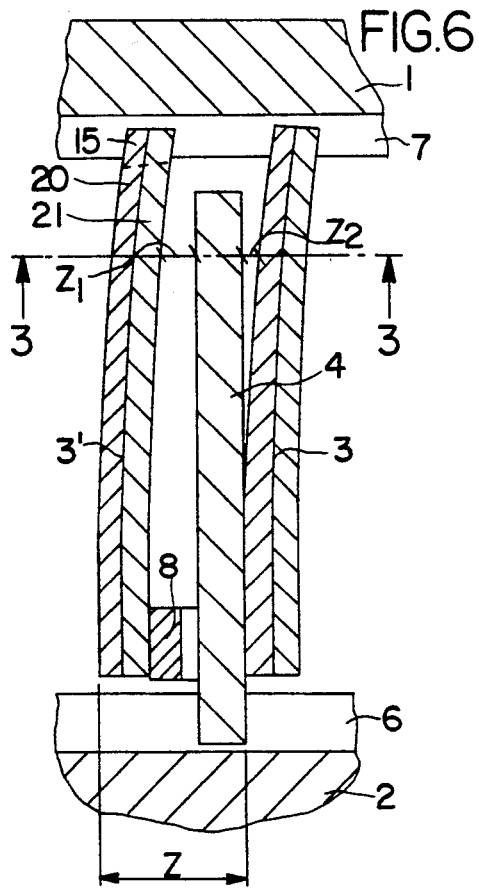
FIG. 6 is like FIG. 2 an enlarged view showing the detail D in FIG. 2 but illustrates a second embodiment of the invention in a state involving liquid friction.
Figure 7:
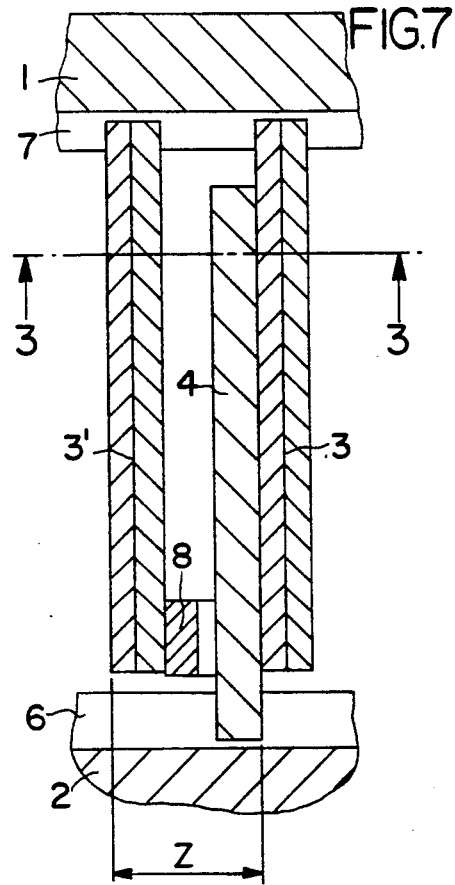
FIG. 7 is a view that is similar to FIG. 6 but illustrates a state involving solid-to-solid friction.

Another embodiment of the invention is shown in FIGS. 6 and 7 and differs from the embodiment shown in FIGS. 2 to 5 in that the inner disks 4 are made of a conventional material and the outer disks 3 are made of a thermally responsive material. The action is the same as described hereinbefore but in this case the external splines 15 of the outer disk will be displaced in the internal splines 7 of the housing 1 during a flattening of the outer disks in response to a temperature rise.

Figure 8:
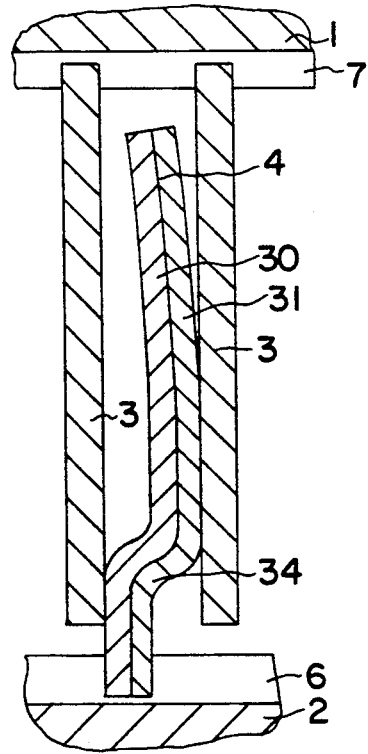
FIG. 8 is an enlarged view showing the detail D in FIG. 1 but illustrates a third embodiment.
Figure 9:
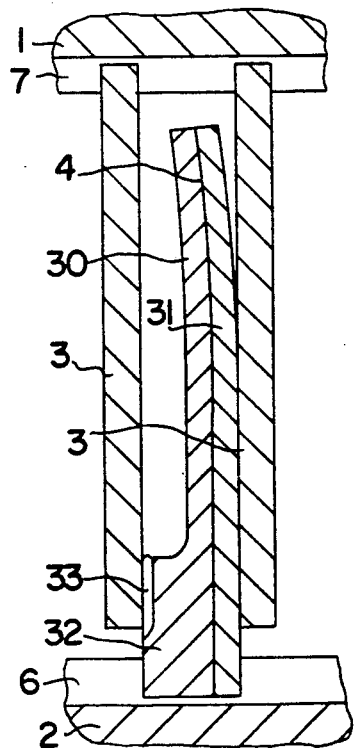
FIG. 9 is an enlarged view showing the detail D in FIG. 1 but illustrates a fourth embodiment.

The embodiments shown in FIGS. 8 and 9 differ from the one shown in FIGS. 2 to 5 in that a loose spacer ring 8 is not provided but the inner portion of each inner disk 4 (or the inner portion of each outer disk 3) is designed to constitute a spacer. In the embodiment shown in FIG. 8 the inner portion 34 is given a concave shape in the same operation in which the inner disk 4 is shaped or preshaped. In the embodiment shown in FIG. 9 the bimetal disk 4 has a portion 30, which constitutes a spacer 32, which may optionally be formed with lubricating pockets 33, which just as the spacer 34 shown in FIG. 8 may be formed in the operation by which the inner disk is shaped or preshaped.

Figure 10:
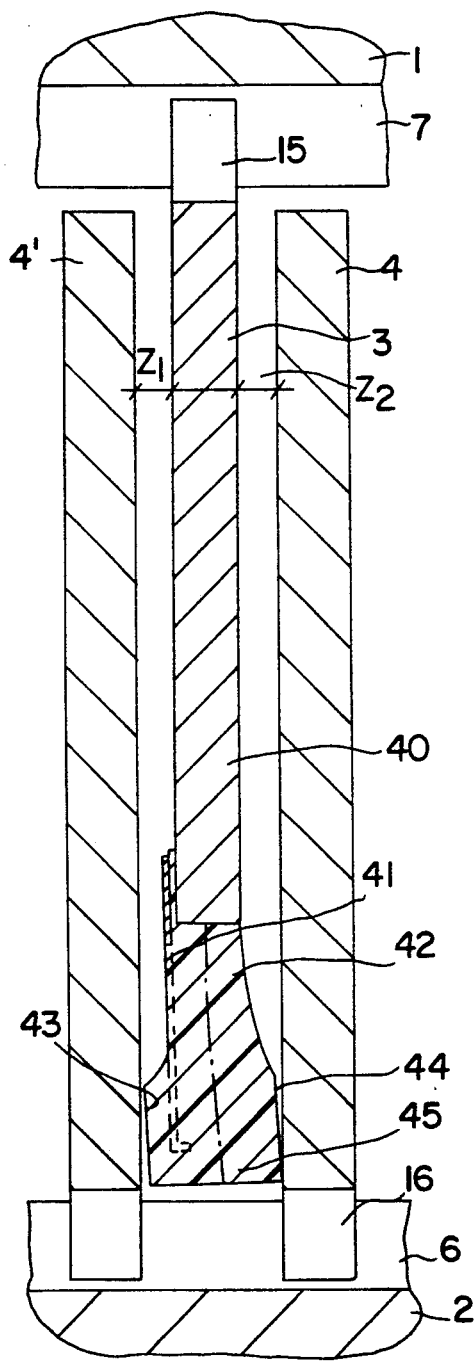
FIG. 10 is an enlarged view showing the detail D in FIG. 1 but illustrates a further embodiment of the invention in a state involving liquid friction.
Figure 11:
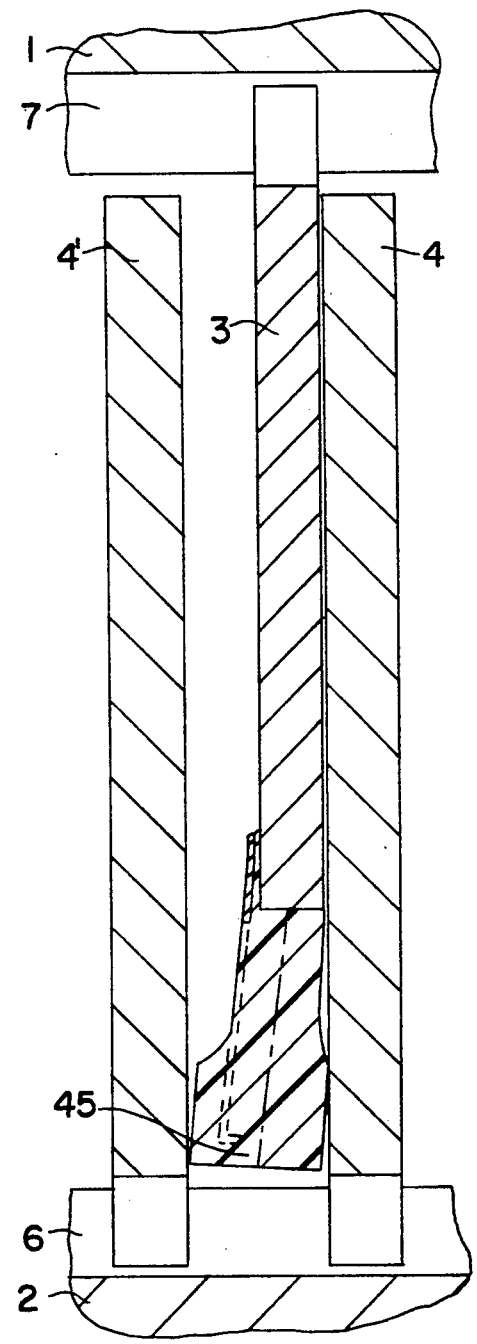
FIG. 11 is a view that is similar to FIG. 10 but illustrates a state involving solid-to-solid friction.

In a modification of the invention, illustrated in FIGS. 10 and 11, each inner disk 4 and a portion of each outer disk 3 are made of a conventional material. Each outer disk 3 consists of an annular portion 40, which is not thermally responsive and which is adjoined by an inner annular portion 42, which comprises a matrix of plastic, preferably PTFE (polytetrafluoroethylene), and a metal ring 41, which is preferably radially slit (not shown) and is embedded in said plastic matrix and spaced from the radial and peripheral plane of symmetry of the annular portion 42.

The different coefficients of thermal expansion of the plastic and metal will result in a thermal deformation like that exhibited by a bimetal. The annular portion 42 is shaped to have at its inside periphery a spacing bead 43 bearing on the inner disk 4' of the adjacent pair of disks.

The position illustrated in FIG. 10 will be assumed when the coupling is at room temperature in a state involving liquid friction. The two gaps z1 and z2 then have the same width so that a very low torque is being transmitted. In response to a temperature rise the metal ring 41 will cause the annular portion 42 to wrap so that the engagement of the spacing bead 43 on the left-hand inner disk 4' will cause the plate 40 of the outer disk 3 to move to the right. As a result, the gap width z2 will decrease and a higher torque will be transmitted until a state involving solid-to-solid friction between the disks 3 and 4 of the same pair of disks is assumed.

In the embodiments shown in FIGS. 10 and 11 the change to a state involving solid-to-solid friction may also be accelerated by the provision of scraping edges.

In any case the sudden movement of the two disks of the same pair of disks to contact each other throughout their confronting surfaces will result in a particularly steep rise of the torque. When that torque rise has produced the desired result, e.g., has caused the obstacle off the road to be overcome, the state involving solid-to-solid friction will be abandoned because the temperature in the coupling will drop and the thermally responsive annular portion 42 will warp in response to such temperature drop so that the plate 40 will move to the left until the gap widths z1 and z2 are equal.

That embodiment provides for a particularly wide control range from the transmission of a very low torque to the transmission of a fairly high torque, whereafter the torque will rise quickly to the high hump torque.

In conclusion it is stated that various embodiments have been described hereinbefore only by way of example and that various features of such embodiments may be embodied in other combinations within the scope of the invention. For instance, the annular portion 42 might consist of a bimetal or of an alloy having a shape memory or the annular portion 42 may be joined to the plate 40 in any desired manner.

I claim:

1. A liquid friction coupling comprising:
   a first coupling part, which comprises a housing filled with a viscous liquid and a set of axially spaced apart outer disks, which extend in and are non-rotatably connected to said housing;
   a second coupling part, which is rotatable relative to said first coupling part and comprises a shaft, which protrudes axially into said housing, and a set of axially spaced apart inner disks, which are non-rotatably connected to said shaft and each of which extends between two adjacent ones of said outer disks and constitutes a pair of disks with one of said adjacent outer disks, wherein
   each of said inner disks is axially spaced from the adjacent outer disk of an adjacent pair of disks by a spacer ring surrounding said shaft, and
   each of said disks of one of said sets of disks comprises at least in part a material which tends to exhibit a thermal deformation in an axial direction.

2. A liquid friction coupling as set forth in claim 1, wherein said material comprises a bimetal.

3. A liquid friction coupling as set forth in claim 1, wherein said material has a shape memory.

4. A liquid friction coupling as set forth in claim 1, wherein each of said disks of said one set comprises entirely a material which tends to exhibit a thermal deformation in an axial direction.

5. A liquid friction coupling as set forth in claim 4, wherein
   each of said disks of said one set tends to assume at a relatively low temperature a bowl shape diverging from the other disk of the same pair of disks and to flatten in response to a temperature rise.

6. A liquid friction coupling as set forth in claim 5, wherein
   each of said spacer rings has a side face axially facing one of said disks and in sliding contact with said one disk only in part of an area of said side face.

7. A liquid friction coupling as set forth in claim 6, wherein said spacer rings are formed with radially extending corrugations.

8. A liquid friction coupling as set forth in claim 5, wherein said spacer rings are provided adjacent to an inside periphery of said outer disks.

9. A liquid friction coupling as set forth in claim 8, wherein said inner disks comprise said material which tends to exhibit a thermal deformation in an axial direction.

10. A liquid friction coupling as set forth in claim 9, wherein
    each of said inner disks is formed with radial slots dividing said inner disk into a plurality of sectors, wherein, for each inner disk, the surface of each of said sectors nearest to its paired outer disk is convex at ambient temperature and is slightly concave at a relatively high temperature.

11. A liquid friction coupling as set forth in claim 1, wherein each of said spacer rings is integral with one of said inner disks.

12. A liquid friction coupling as set forth in claim 11, wherein each of said spacer rings has a side face which faces one of said outer disks and is in sliding contact with said one outer disk only in part of an area of said side face.

13. A liquid friction coupling as set forth in claim 11, wherein each of said inner disks and the spacer ring which is integral therewith comprise shaped flat stock.

14. A liquid friction coupling according to claim 13, wherein said inner disks and the space ring which is integral therewith comprise embossed flat stock.

15. A liquid friction coupling as set forth in claim 13, wherein said inner disks and the space ring which is integral therewith comprise stamped flat stock.

16. A liquid friction coupling as set forth in claim 1, wherein
each of said spacer rings is disposed adjacent to an inside periphery of and integrally formed with one of said outer disks to constitute an annular portion of said outer disk and comprises a material which tends to exhibit a thermal deformation in an axial direction.

17. A liquid friction coupling as set forth in claim 16, wherein said annular portions comprise an alloy having a shape memory.

18. A liquid friction coupling as set forth in claim 15, wherein said annular portions comprise a plastic matrix having a peripheral and radial plane of symmetry and a metal ring embedded in said matrix and spaced from said plane of symmetry.

19. A liquid friction coupling as set forth in claim 18, wherein said matrix comprises polytetrafluoroethylene.

20. A liquid friction coupling as set forth in claim 18, wherein said metal ring comprises steel and is radially split.

21. A liquid friction coupling as set forth in claim 1, wherein
each of said disks of said one set of disks comprises at least in part a material tending to exhibit such a thermal deformation that said disk tends to be deformed toward the other disk of the same pair of disks in response to a temperature rise, and
all said disks of said one set have the same thermal deformation characteristic.

22. A liquid friction coupling as set forth in claim 21, wherein
said disks of each of said pairs of disks have confronting surfaces which contact each other and
all said disks of said one set have such a thermal deformation characteristic that said confronting surfaces of said disks of each of said pairs of disks will be in contact with each other substantially throughout an area of said confronting surfaces at and above a predetermined elevated temperature.

* * * * *